United States Patent
Mizobe

(10) Patent No.: US 11,383,858 B2
(45) Date of Patent: Jul. 12, 2022

(54) RUNWAY-EMBEDDED FLASH LIGHTING DEVICE

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 17/287,604

(22) PCT Filed: Aug. 21, 2019

(86) PCT No.: PCT/JP2019/032556
§ 371 (c)(1),
(2) Date: Apr. 22, 2021

(87) PCT Pub. No.: WO2020/084882
PCT Pub. Date: Apr. 30, 2020

(65) Prior Publication Data
US 2021/0394926 A1 Dec. 23, 2021

(30) Foreign Application Priority Data

Oct. 26, 2018 (JP) .............................. JP2018-201402

(51) Int. Cl.
*F21V 29/503* (2015.01)
*B64F 1/20* (2006.01)
(Continued)

(52) U.S. Cl.
CPC ............... *B64F 1/20* (2013.01); *B64D 45/08* (2013.01); *F21S 10/06* (2013.01); *F21V 15/01* (2013.01);
(Continued)

(58) Field of Classification Search
CPC ....................... B64D 2203/00; F21W 2111/06
See application file for complete search history.

(56) References Cited

U.S. PATENT DOCUMENTS

| 3,113,726 A | 12/1963 | Pennow et al. |
| 4,112,485 A | 9/1978 | Sutter |

(Continued)

FOREIGN PATENT DOCUMENTS

| CN | 101761840 A | 6/2010 |
| CN | 102537772 A | 7/2012 |

(Continued)

OTHER PUBLICATIONS

English machine translation of Young KR 10-0952375, published 2010 (Year: 2010).*

(Continued)

*Primary Examiner* — Evan P Dzierzynski
(74) *Attorney, Agent, or Firm* — Sughrue Mion, PLLC

(57) ABSTRACT

A runway-embedded flash lighting device includes: a body configured to be embedded in a runway; a ceiling member including a flash emission window, disposed in an upper opening of the body and configured to be exposed to a runway surface when the body is embedded in the runway; a light guide member disposed in the flash emission window; an LED flash light source disposed inside the body and configured to emit a flash toward the light guide member; and a bottom cover member disposed on and covering the lower opening of the body and including on an outer surface thereof on a side opposite to the body, a support portion protruding from the outer surface of the bottom cover member.

18 Claims, 10 Drawing Sheets

(51) Int. Cl.
  *B64D 45/08* (2006.01)
  *F21S 10/06* (2006.01)
  *F21V 15/01* (2006.01)
  *F21Y 115/10* (2016.01)
  *F21W 111/06* (2006.01)
(52) U.S. Cl.
  CPC ........ *F21V 29/503* (2015.01); *B64D 2203/00* (2013.01); *F21W 2111/06* (2013.01); *F21Y 2115/10* (2016.08)

(56) References Cited

U.S. PATENT DOCUMENTS

| | | | |
|---|---|---|---|
| 4,860,182 A | 8/1989 | Vadseth | |
| 6,354,714 B1* | 3/2002 | Rhodes | F21S 4/24 362/153.1 |
| 7,201,490 B1* | 4/2007 | Bieberdorf | B64F 1/20 362/153 |
| 2003/0048634 A1 | 3/2003 | You et al. | |
| 2006/0072312 A1* | 4/2006 | Cuypers | F21V 29/15 362/227 |
| 2008/0007430 A1 | 1/2008 | Wang et al. | |
| 2010/0277901 A1 | 11/2010 | Farchtchian et al. | |
| 2011/0121734 A1 | 5/2011 | Pape | |
| 2016/0281965 A1 | 9/2016 | Schneider et al. | |
| 2017/0211247 A1 | 7/2017 | Messiou et al. | |
| 2018/0162554 A1* | 6/2018 | Marquez | F21S 8/032 |

FOREIGN PATENT DOCUMENTS

| | | |
|---|---|---|
| CN | 202501314 U | 10/2012 |
| JP | 2000-228103 A | 8/2000 |
| JP | 2012-204205 A | 10/2012 |
| JP | 2016-026929 A | 2/2016 |
| JP | 2016-195072 A | 11/2016 |
| JP | 2017-054675 A | 3/2017 |
| KR | 10-0952375 B1 | 4/2010 |
| WO | 2009/077010 A1 | 6/2009 |

OTHER PUBLICATIONS

Office Action dated Nov. 15, 2021 in related U.S. Appl. No. 17/287,606.
International Search Report for PCT/JP2019/032554 dated Oct. 15, 2019.
International Search Report for PCT/JP2019/032555 dated Oct. 21, 2019.
International Search Report for PCT/JP2019/032558 dated Oct. 15, 2019.
International Search Report for PCT/JP2019/032556 dated Oct. 21, 2019 (PCT/ISA/210).
Australian Examination Report dated Nov. 15, 2021 in the related Australian Patent Application No. 2019367751.
Office Action dated Dec. 7, 2021 in the related U.S. Appl. No. 17/287,609.
Office Action dated Nov. 19, 2021 in the related U.S. Appl. No. 17/287,608.
Office Action dated Mar. 18, 2022 in U.S. Appl. No. 17/287,609.
Examination Report dated Mar. 8, 2022 in Australian Application No. 2019365599.
Examination Report dated Mar. 30, 2022 in Australian Application No. 2019367751.

* cited by examiner (A)

(B)

RUNWAY-EMBEDDED FLASH LIGHTING DEVICE

CROSS REFERENCE TO RELATED APPLICATIONS

This application is a National Stage of International Application No. PCT/JP2019/032556 filed Aug. 21, 2019, claiming priority based on Japanese Patent Application No. 2018-201402 filed Oct. 26, 2018.

TECHNICAL FIELD

The present invention relates to a runway-embedded flash lighting device.

BACKGROUND ART

Conventionally, marker lamps for emitting marker light have been embedded under an airfield runway as a guide sign (for example, see Patent Literature 1). In the marker lamp embedded under an airfield runway, a discharge lamp containing xenon is sometimes used as a flash light source.

CITATION LIST

Patent Literature

Patent Literature 1: JP 2000-228103 A

SUMMARY OF INVENTION

Technical Problem

However, a flash lighting device using a xenon flash light source is heavy, has a short life, has a low effective luminous intensity, cannot switch the luminous intensity among high luminous intensity, medium luminous intensity, and low luminous intensity, and consumes a large amount of power. In addition, since the runway-embedded flash lighting device includes a cable gland or the like at the bottom, when the device is taken out for installation or maintenance and placed on the ground, for example, it was necessary to prepare a platform or to invert or tilt the device. Therefore, the work becomes complicated and there is a risk that the cable gland or the like is damaged.

With the foregoing in mind, it is an object of the present invention to provide a new runway-embedded flash lighting device that is light, has a long life, has high effective luminous intensity, can switch the luminous intensity, is low in power dissipation, and can be placed on the ground with its bottom facing down without requiring a platform or the like.

Solution to Problem

In order to achieve the above object, according to one aspect of the present invention there is provided a runway-embedded flash lighting device including: a cylindrical body; a ceiling member; a light guide member; an LED flash light source; and a bottom cover member, wherein the cylindrical body can be embedded in a runway, the ceiling member is placed in an upper opening of the cylindrical body in a state of being able to be exposed to a runway surface when the cylindrical body is embedded in the runway, the ceiling member is provided with a flash emission window, the light guide member is placed in the flash emission window, the LED flash light source is placed inside the cylindrical body in a state of capable of emitting flash toward the light guide member placed in the flash emission window, the light guide member allows flash emitted from the LED flash light source to be emitted to an outside from the flash emission window, the bottom cover member is placed in a state of capable of closing the lower opening of the cylindrical body, and the bottom cover member is provided with, on an outer surface thereof on a side opposite to the cylindrical body, a support portion protruding from the outer surface.

Advantageous Effects of Invention

The runway-embedded flash lighting device of the present invention is light, has a long life, has high effective luminous intensity, can switch the luminous intensity, is low in power dissipation, and can be placed on the ground with its bottom facing down without requiring a platform or the like.

DESCRIPTION OF EMBODIMENTS

Figure 1:
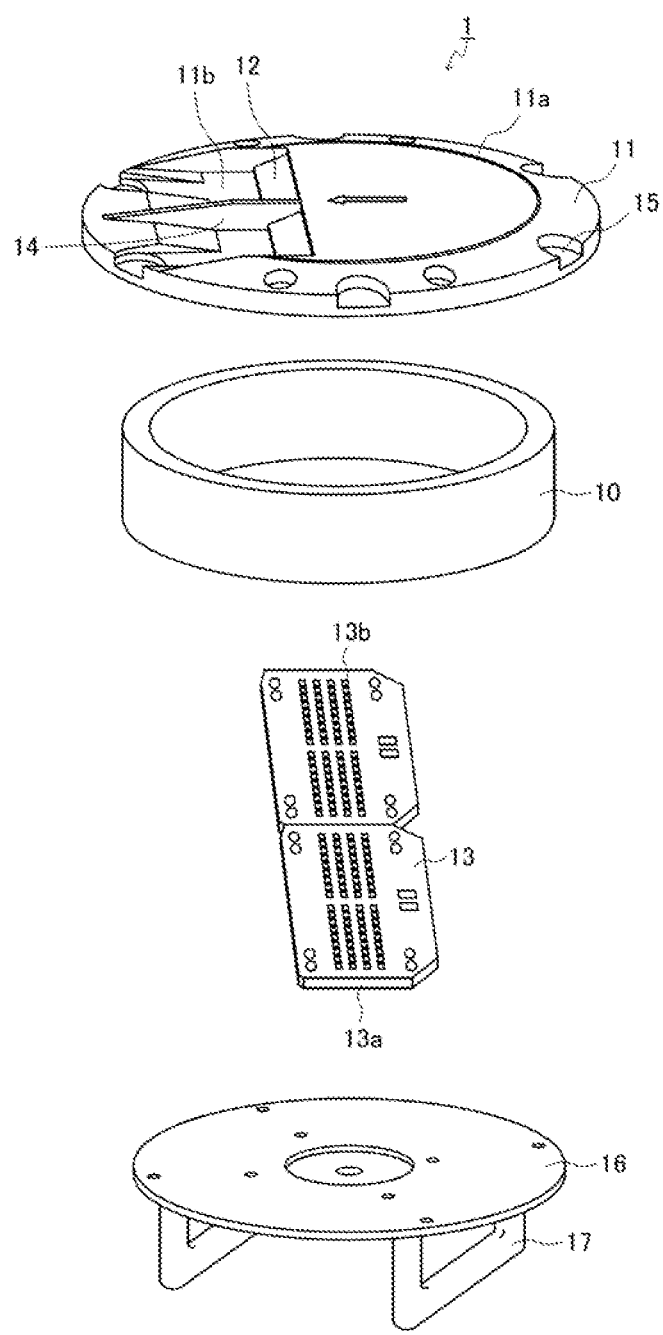
FIG. 1 is an exploded perspective view showing the configuration of an example of the runway-embedded flash lighting device according to the first example embodiment.

Next, example embodiments of the present invention will be described with reference to FIGS. 1 to 10. The present invention, however, is not limited or restricted to the following example embodiments by any means. In FIGS. 1 to 10, identical parts are indicated with identical reference signs. Regarding the descriptions of the example embodiments, reference can be made to one another. Furthermore, in the drawings, for ease of description, illustration of the structures of the components may be appropriately simplified, and the size, the ratio, and the like of components may be schematically shown and different from actual ones.

First Example Embodiment

FIG. 1 is an exploded perspective view showing the configuration of an example of the runway-embedded flash lighting device according to the present example embodiment. As shown in FIG. 1, a runway-embedded flash lighting device 1 includes a cylindrical body 10, a ceiling member 11, a light guide member 12, an LED flash light source 13, and a bottom cover member 16.

The cylindrical body 10 can be embedded in a runway 2 as will be described below with reference to FIG. 7 in the second example embodiment. The cylindrical body 10 may be, for example, a circular cylinder as shown in FIG. 1, or may be a cylinder other than a circular cylinder such as an elliptical cylinder or a polygonal cylinder.

The ceiling member 11 is placed in the upper opening of the cylindrical body 10 in a state of being able to be exposed to the runway surface when the cylindrical body 10 is embedded in the runway 2.

Figure 2:
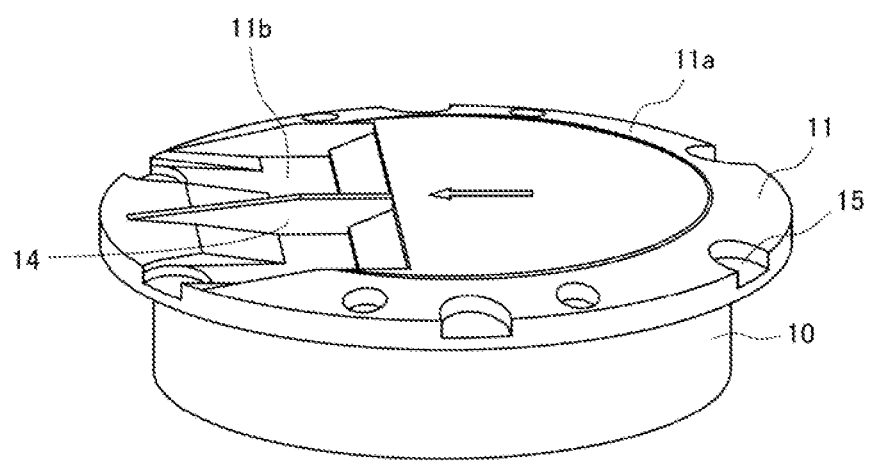
FIG. 2 is a perspective view from above showing an example of the cylindrical body and ceiling member in the runway-embedded flash lighting device according to the first example embodiment.

The cylindrical body 10 and the ceiling member 11 may be separate members as shown in FIG. 1, or may be integrally molded as an integrally molded product as shown in FIG. 2. Examples of the integrally molded product include aluminum castings, titanium castings, aluminum alloy castings, and titanium alloy castings. Among them, aluminum castings and titanium castings are preferable because they are light, and aluminum castings are particularly preferable because they are inexpensive. When the cylindrical body 10 and the ceiling member 11 are separate members, as in the case of the integrated molding product, the cylindrical body 10 and ceiling member 11 may be, for example, aluminum castings, titanium castings, aluminum alloy castings, or titanium alloy castings.

The ceiling member 11 is provided with a flash emission window, and the light guide member 12 is placed in the flash emission window. The runway-embedded flash lighting device 1 of the present example embodiment may include two or more flash emission windows, and the light guide member 12 may be placed in each of the flash emission windows, for example. If two or more light guide members 12 are used, the burden on the light guide member 12 can be further reduced and damage can be prevented. For example, as shown in FIG. 1, the flash emission window and the light guide member 12 may be divided into two or more by a reinforcing plate member 14 to be described below. The light guide member 12 may be, for example, a prism lens or the like. The material of the prism lens is not particularly limited, and may be, for example, glass or the like.

The ceiling member 11 may have a stepped structure that includes an upper ceiling portion 11a and a lower ceiling portion 11b, wherein the upper ceiling portion 11a is placed on the rear side relative to the emission direction of the flash emission window, and the lower ceiling portion 11b is placed on the emission direction side of the flash emission window, for example.

The runway-embedded flash lighting device 1 of the present example embodiment may further include the reinforcing plate member 14, and the reinforcing plate member 14 may be placed on the outer surface of the lower ceiling portion 11b in a state of standing upright in the vertical direction of the outer surface of the lower ceiling portion 11b, for example. The ceiling member 11 and the reinforcing plate member 14 may be separate members or may be integrally molded as an integrally molded product, for example. When the ceiling member 11 and the reinforcing plate member 14 are separate members, as in the case of the integrated molding product, the reinforcing plate member 14 may be, for example, aluminum castings, titanium castings, aluminum alloy castings, or titanium alloy castings.

The runway-embedded flash lighting device 1 of the present example embodiment may further include a fixing member 15, the fixing member 15 may be placed on the outer peripheral side of the ceiling member 11, and the fixing member 15 may be provided with a screw hole to be inserted with a screw for fixing to the runway 2, for example. The fixing member 15 may have a tapered shape in which the outer surface is inclined so as to be thinner toward the outer periphery, for example. The ceiling member 11 and the fixing member 15 may be, for example, separate members or may be integrally molded as an integrally molded product. When the ceiling member 11 and the fixing member 15 are separate members, as in the case of the integrated molding product, the fixing member 15 may be, for example, aluminum castings, titanium castings, aluminum alloy castings, or titanium alloy castings. At least one of the ceiling member 11 and the fixing member 15 may have a hole through which the runway-embedded flash lighting device 1 is pulled up by a tool.

Figure 3:
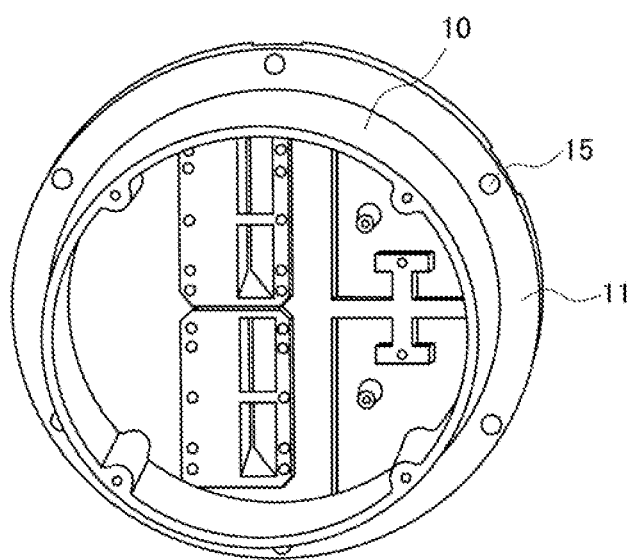
FIG. 3 is a perspective view from below showing an example of the cylindrical body and ceiling member in the runway-embedded flash lighting device according to the first example embodiment.

The LED flash light source 13 is placed inside the cylindrical body 10 in a state of capable of emitting flash toward the light guide member 12 placed in the flash emission window. FIG. 3 is a perspective view from below showing an example of the cylindrical body 10 and ceiling member 11. For example, as shown in FIG. 3, the inner surface of the ceiling member 11 (the surface on the cylindrical body 10 side) may be provided with a site to be placed with the LED flash light source 13 below the flash emission window. The light guide member 12 allows flash emitted from the LED flash light source 13 to be emitted to the outside from the flash emission window.

The LED flash light source 13 may be, for example, an LED module or the like. The LED flash light source 13 includes a substrate 13a and an LED 13b, and the LED 13b is placed on the substrate 13a as shown in FIG. 1, for example. While the number of the LED flash light sources 13 is two in the example shown in FIG. 1, the number of LED flash light sources 13 may be one or three or more.

The conditions for mounting the LED 13b on the substrate 13a is not particularly limited, and can be appropriately set according to the desired optical properties. FIG. 1 shows an example in which 4×9=36 matrixes are two, i.e., seventy-two LEDs 13b are mounted on the substrate 13a.

The shape of the LED 13b is not particularly limited, and is generally a square shape or a rectangular shape. The size of the LED 13b is not particularly limited, and in the case of a square, the length of one side is, for example, 1.8 to 2.2 mm, 3 to 3.5 mm, or 4 to 5.3 mm, and in the case of a rectangle, the length of the short side is, for example, the same as the length of the square, and the ratio of the short side to the long side is, for example, 1:1 to 3. On the surface of the substrate 13a to which the LEDs 13b are mounted, the width between the adjacent LEDs is, for example, 0.2 to 0.5 mm.

Figure 4:
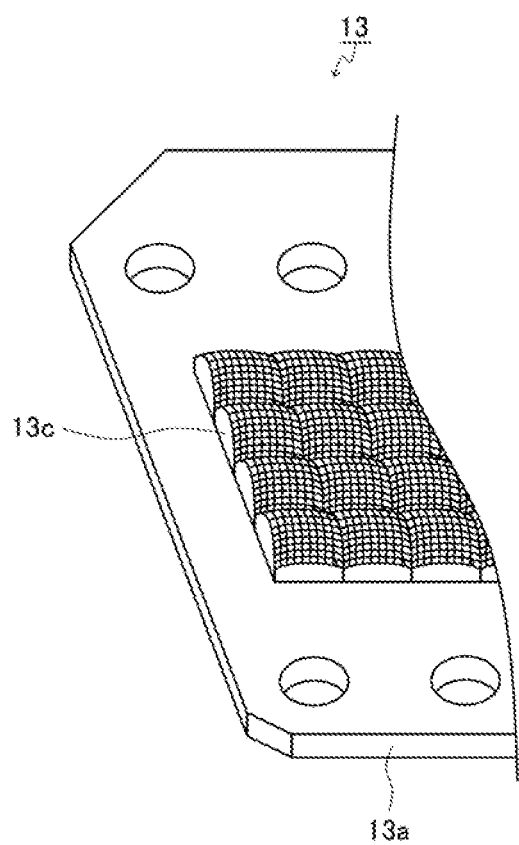
FIG. 4 is a partially enlarged perspective view showing an example of the LED flash light source in the runway-embedded flash lighting device according to the first example embodiment.
Figure 5:
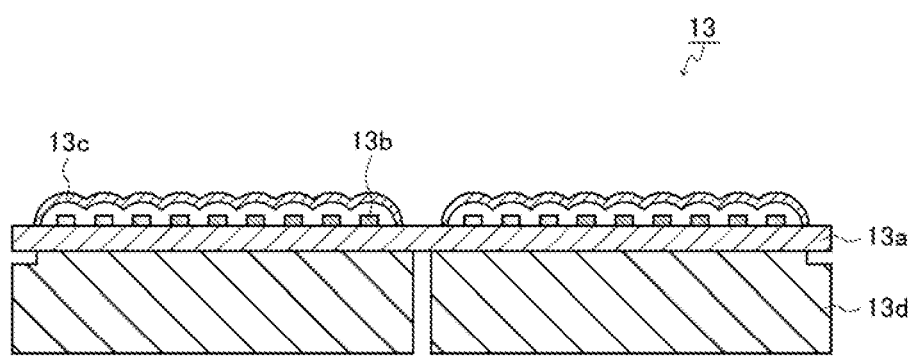
FIG. 5 is a cross-sectional view illustrating an example of the LED flash light source in the runway-embedded flash lighting device according to the first example embodiment.

The LED flash light source 13 may include a lens member 13c, the lens member 13c may be placed above the LED 13b, and the lens member 13c may be a lens member that allows the emission surface of flash emitted from the LED 13b to have a uniform illuminance distribution, for example, as shown in the partially enlarged perspective view of FIG. 4 and the cross-sectional view of FIG. 5. Examples of the lens member 13c include a fly-eye lens and an integrator lens. For example, as shown in FIG. 5, by dividing the lens member 13c into two or more pieces so as not to become too large, the burden on the lens member 13c can be further reduced and damage can be prevented. It is preferable that the lens member 13c be not too small so as not to cause loss in extraction of the emitted flash.

The runway-embedded flash lighting device 1 of the present example embodiment may further include a heat radiating member 13d, and the heat radiating member 13d may be placed on the substrate 13a of the LED flash light source 13 on the surface opposite to the LED 13b mounting side, for example, as shown in FIG. 5. While FIG. 5 shows an example in which the heat radiating member 13d is a heat radiating fin, it is also possible to radiate heat using a fan or the like that blows air toward the substrate 13a.

The bottom cover member 16 is placed in a state of capable of closing the lower opening of the cylindrical body 10. The bottom cover member 16 is provided with, on the outer surface thereof on the side opposite to the cylindrical body 10, a support portion 17 protruding from the outer surface. Examples of the material of the bottom cover member 16 include aluminum, titanium, aluminum alloy, titanium alloy, and castings thereof.

The support portion 17 may be any portion as long as it allows the runway-embedded flash lighting device 1 to be placed on the ground with its bottom facing down without requiring a platform or the like, and there are no particular restrictions on the configurations such as its shape, size, height, number, and the like. FIG. 1 shows the runway-embedded flash lighting device 1 in which two support portions 17, including two strut portions standing from the outer surface and a beam portion passed over the upper ends of the two strut portions, are placed on the outer surface of the bottom cover member 16 in a state of facing each other. The two supporting portions 17 have the same height protruding from the outer surface. For example, in the aspect shown in FIG. 1, the support portion 17 also serves as a handle, and the runway-embedded flash lighting device 1 can be easily carried by a human hand.

Figure 6:
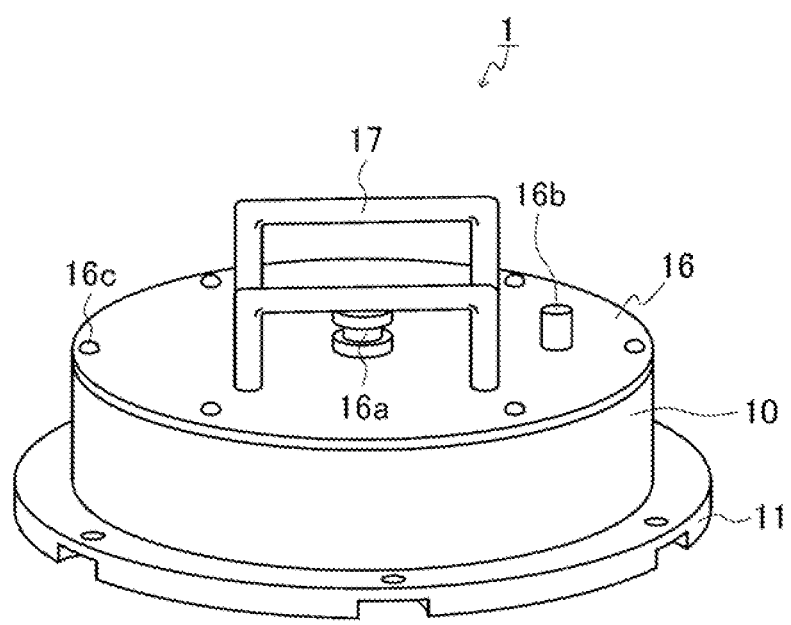
FIG. 6 is a perspective view from below showing the runway-embedded flash lighting device shown in FIG. 1.

FIG. 6 is a perspective view from below showing the runway-embedded flash lighting device 1 shown in FIG. 1. For example, as shown in FIG. 6, the bottom cover member 16 may include a cable gland 16a and an external ground terminal 16b. From the viewpoint of preventing the cable gland 16a and the external ground terminal 16b from coming into contact with the ground and being damaged, the height of the support portion 17 protruding from the outer surface of the bottom cover member 16 is preferably equal to or greater than the heights of the cable gland 16a and the external ground terminal 16b protruding from the outer surface. Further, when the bottom cover member 16 is attached to at least one of the cylindrical body 10 and the LED flash light source 13 with a screw 16c and an O-ring (not shown), for example, the runway-embedded flash lighting device 1 can be waterproof.

FIGS. 10A and 10B are views showing variations of the support portion 17. As shown in FIGS. 10A and 10B, even with three or more support portions 17 having various shapes such as a cylindrical shape and a U shape, it is possible to place the runway-embedded flashlight device 1 on the ground with its bottom facing down without requiring a platform or the like. When two or more support portions 17 are provided, it is preferable that the two or more support portions 17 be placed on the outer surface of the bottom cover member 16 in a state of aligning in the circumferential direction, and it is preferable that the two or more support portions 17 be placed at equal spacings in the circumferential direction. Although it is not shown, even with one support portion 17 having a columnar shape (e.g., circular column, elliptical column, polygonal column, etc.), cylindrical shape (e.g., circular cylinder, elliptical cylinder, polygonal cylinder, etc.), or the like, it is possible to place the runway-embedded flash lighting device 1 on the ground with its bottom facing down without requiring a platform or the like.

Figure 8:
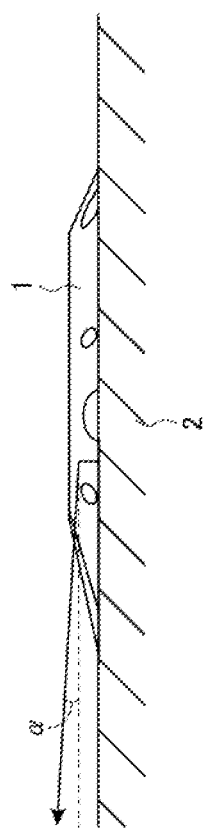
FIG. 8 is a schematic side view explaining flash emission in the runway-embedded flash lighting device according to the first example embodiment.
Figure 9:
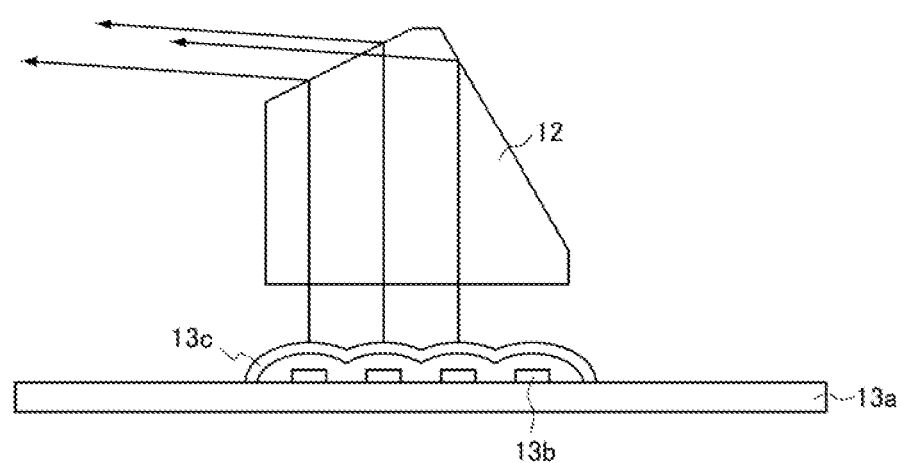
FIG. 9 is a side view showing an example of the light guide member and LED flash light source inside the runway-embedded flash lighting device shown in FIG. 8.
Figure 10:
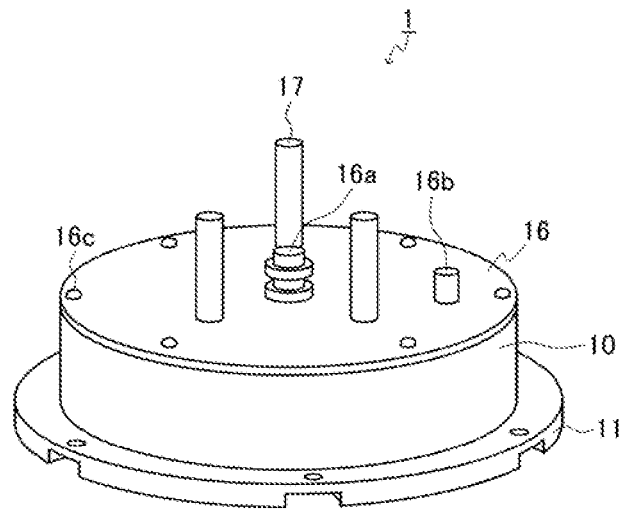
FIGS. 10A and 10B are views showing variations of a support portion in the runway-embedded flash lighting device according to the first example embodiment.
Figure 10:
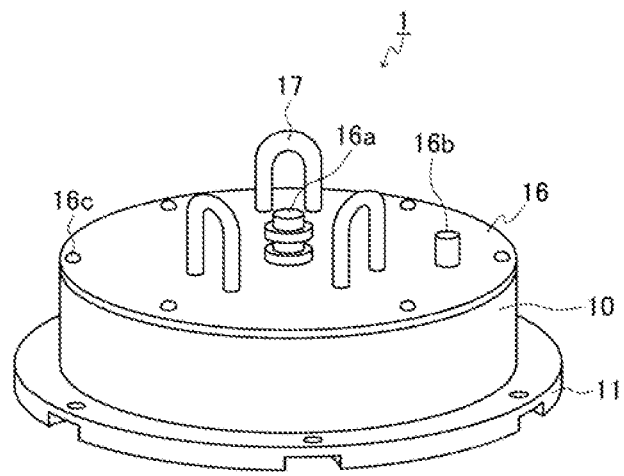

It is preferable that an upward flash having an angle $\alpha$ of about 3 degrees with respect to a direction parallel to the runway surface be emitted from the runway-embedded flash lighting device 1 of the present example embodiment, for example, as shown in FIG. 8. The light guide member 12 and the LED flash light source 13 inside the runway-embedded flash lighting device 1 shown in FIG. 8 can be shown as in FIG. 9.

While the weight of a flash lighting device using a xenon flash light source is 65 kg or less, specifically, about 40 kg, the weight of the runway-embedded flash lighting device 1 of the present example embodiment is, for example, 18 kg or less, specifically, about 11 kg. Thus, according to the present example embodiment, it is possible to provide a light runway-embedded flash lighting device.

While the lifetime of a flash lighting device using a xenon flash light source is about 500 hours, the runway-embedded flash lighting device 1 of the present example embodiment can be used indefinitely, for example. Thus, according to the present example embodiment, it is possible to provide a runway-embedded flash lighting device having a long life.

While the effective luminous intensity of a flash lighting device using a xenon flash light source is 1000 cd or more, specifically about 1200 cd, the effective luminous intensity of the runway-embedded flash lighting device 1 of the present example embodiment is, for example, 6000 cd or more, specifically about 7000 cd. Thus, according to the present example embodiment, it is possible to provide a runway-embedded flash lighting device having a high effective luminous intensity.

While a flash lighting device using a xenon flash light source cannot switch the luminous intensity among high luminous intensity, medium luminous intensity, and low luminous intensity, since the runway-embedded flash lighting device 1 of the present example embodiment has high effective luminous intensity as described above, it can switch the luminous intensity among high luminous intensity (e.g., 6000 cd or more), medium luminous intensity (e.g., 1000 cd or more), and low luminous intensity (e.g., 250 cd or more), for example. Thus, according to the present example embodiment, it is possible to provide a runway-embedded flash lighting device that can switch the luminous intensity. The high luminous intensity is used, for example, in the daytime of poor visibility due to fog, rain, or the like, the low luminous intensity is used, for example, in the night, and the medium luminous intensity is used, for example, in the evening.

While the power dissipation of a flash lighting device using a xenon flash light source is about 500 W, the power dissipation of the runway-embedded flash lighting device 1 of the present example embodiment is, for example, about 80 W (up to 114 W at high luminous intensity, 31 W at medium luminous intensity, 24 W at low luminous intensity). Thus, according to the present example embodiment, it is possible to provide a runway-embedded flash lighting device that is low in power dissipation.

Second Example Embodiment

Figure 7:
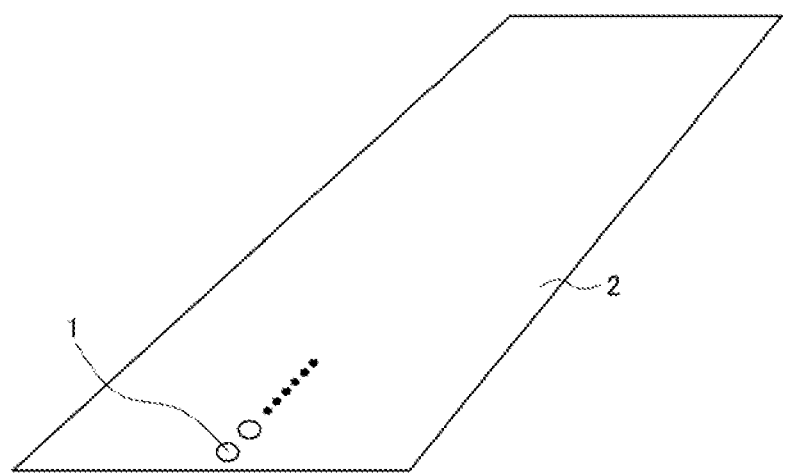
FIG. 7 is a schematic perspective view showing the configuration of an example of the runway according to the second example embodiment.

FIG. 7 is a schematic perspective view showing the configuration of an example of the runway of the present example embodiment. While the runway is shown schematically simplified in FIG. 7, the runway 2 is one in which the runway-embedded flash lighting device 1 of the first example embodiment is embedded with the ceiling member 11 exposed.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

Supplementary Notes

A part of or the whole of the above-described example embodiments can be described as the following supplementary notes. However, the present invention is by no means limited thereto.

(Supplementary Note 1)
A runway-embedded flash lighting device including:
 a cylindrical body;
 a ceiling member;
 a light guide member;
 an LED flash light source; and
 a bottom cover member, wherein
 the cylindrical body can be embedded in a runway,
 the ceiling member is placed in an upper opening of the cylindrical body in a state of being able to be exposed to a runway surface when the cylindrical body is embedded in the runway,
 the ceiling member is provided with a flash emission window,
 the light guide member is placed in the flash emission window,
 the LED flash light source is placed inside the cylindrical body in a state of capable of emitting flash toward the light guide member placed in the flash emission window,
 the light guide member allows flash emitted from the LED flash light source to be emitted to an outside from the flash emission window,
 the bottom cover member is placed in a state of capable of closing the lower opening of the cylindrical body, and
 the bottom cover member is provided with, on an outer surface thereof on a side opposite to the cylindrical body, a support portion protruding from the outer surface.

(Supplementary Note 2)
The runway-embedded flash lighting device according to Supplementary Note 1, including:
 two or more support portions, and
 the two or more supporting portions have the same height protruding from the outer surface.

(Supplementary Note 3)
The runway-embedded flash lighting device according to Supplementary Note 2, wherein
 the two support portions are placed on the outer surface of the bottom cover member in a state of facing each other.

(Supplementary Note 4)
The runway-embedded flash lighting device according to Supplementary Note 2 or 3, wherein
 the two or more support portions are placed on the outer surface of the bottom cover member in a state of aligning in a circumferential direction.

(Supplementary Note 5)
The runway-embedded flash lighting device according to Supplementary Note 4, wherein
 the two or more support portions are placed at equal spacings in the circumferential direction.

(Supplementary Note 6)
The runway-embedded flash lighting device according to any one of Supplementary Notes 1 to 5, wherein
 the support portion includes two strut portions standing from the outer surface and a beam portion passed over the upper ends of the two strut portions.

(Supplementary Note 7)
The runway-embedded flash lighting device according to any one of Supplementary Notes 1 to 6, wherein
 the bottom cover member includes a cable gland and an external ground terminal,
 the cable gland and the external ground terminal are protruded from the outer surface of the bottom cover member, and
 a height of the support portion protruding from the outer surface is equal to or greater than heights of the cable gland and the external ground terminal protruding from the outer surface.

(Supplementary Note 8)
The runway-embedded flash lighting device according to any one of Supplementary Notes 1 to 7, wherein
 the LED flash light source includes:
 a substrate;
 an LED; and
 a lens member,
 the LED is placed on the substrate,
 the lens member is placed above the LED, and
 the lens member is a lens member that allows an emission surface of flash emitted from the LED to have a uniform illuminance distribution.

(Supplementary Note 9)
The runway-embedded flash lighting device according to Supplementary Note 8, further including:
 a heat radiating member, wherein
 the heat radiating member is placed on the substrate of the LED flash light source on a surface opposite to an LED mounting side.

(Supplementary Note 10)
The runway-embedded flash lighting device according to any one of Supplementary Notes 1 to 9, wherein
 the ceiling member includes an upper ceiling portion and a lower ceiling portion,
 the upper ceiling portion is placed on a rear side relative to an emission direction of the flash emission window, and
 the lower ceiling portion is placed on an emission direction side of the flash emission window.

(Supplementary Note 11)
The runway-embedded flash lighting device according to Supplementary Note 10, further including:
 a reinforcing plate member, wherein
 the reinforcing plate member is placed on an outer surface of the lower ceiling portion in a state of standing upright in a vertical direction of the outer surface of the lower ceiling portion.

(Supplementary Note 12)
The runway-embedded flash lighting device according to any one of Supplementary Notes 1 to 11, wherein
 the cylindrical body and the ceiling member are integrally molded as an integrally molded product.

(Supplementary Note 13)
The runway-embedded flash lighting device according to any one of Supplementary Notes 1 to 12, including:
 two or more flash emission windows, wherein
 the light guide member is placed in each of the flash emission windows.

(Supplementary Note 14)
The runway-embedded flash lighting device according to any one of Supplementary Notes 1 to 13, further including:
a fixing member, wherein
the fixing member is placed on an outer peripheral portion of the ceiling member, and
the fixing member is provided with a screw hole to be inserted with a screw for fixing to the runway.
(Supplementary Note 15)
The runway-embedded flash lighting device according Supplementary Note 14, wherein
the ceiling member and the fixing member are integrally molded as an integrally molded product.
(Supplementary Note 16)
A runway with the runway-embedded flash lighting device according to any one of Supplementary Notes 1 to 15.

This application claims priority from Japanese Patent Application No. 2018-201402 filed on Oct. 26, 2018. The entire subject matter of the Japanese Patent Application is incorporated herein by reference.

INDUSTRIAL APPLICABILITY

The present invention can provide a new runway-embedded flash lighting device that is light, has a long life, has high effective luminous intensity, can switch the luminous intensity, is low in power dissipation, and can be placed on the ground with its bottom facing down without requiring a platform or the like.

REFERENCE SIGNS LIST

1: runway-embedded flash lighting device
2: runway
10: cylindrical body
11: ceiling member
11a: upper ceiling portion
11b: lower ceiling portion
12: light guide member
13: LED flash light source
13a: substrate
13b: LED
13c: lens member
13d: heat radiating member
14: reinforcing plate member
15: fixing member
16: bottom cover member
16a: cable gland
16b: external ground terminal
16c: screw
17: support portion

The invention claimed is:
1. A runway-embedded flash lighting device comprising:
a body;
a ceiling member;
a light guide member;
an LED flash light source; and
a bottom cover member, wherein
the body is configured to be embedded in a runway,
the ceiling member is disposed in an upper opening of the body and configured to be exposed to a runway surface when the body is embedded in the runway,
the ceiling member comprises a flash emission window,
the light guide member is disposed in the flash emission window,
the LED flash light source is disposed inside the body and configured to emit a flash toward the light guide member,
the light guide member is configured to allow the flash emitted from the LED flash light source to be emitted from the flash emission window to outside the runway-embedded flash lighting device,
the bottom cover member is disposed on and covers the lower opening of the body, and
the bottom cover member comprises, on an outer surface thereof on a side opposite to the body, a support portion protruding from the outer surface of the bottom cover member,
wherein
the support portion comprises two strut portions extending from the outer surface of the bottom cover member and a beam portion passing over upper ends of the two strut portions.

2. The runway-embedded flash lighting device according to claim 1, wherein the support portion comprises:
two or more support portion members, and
the two or more supporting portion members have the same height protruding from the outer surface of the bottom cover member.

3. The runway-embedded flash lighting device according to claim 2, wherein
the two support portion members are disposed on the outer surface of the bottom cover member and face each other.

4. The runway-embedded flash lighting device according to claim 2, wherein
the two or more support portion members are placed on the outer surface of the bottom cover member and align in a circumferential direction.

5. The runway-embedded flash lighting device according to claim 4, wherein
the two or more support portion members are equally spaced in the circumferential direction.

6. The runway-embedded flash lighting device according to claim 1, wherein
the LED flash light source comprises:
a substrate;
an LED; and
a lens member,
the LED is disposed on the substrate,
the lens member is disposed above the LED, and
the lens member is configured to allow an emission surface of a flash emitted from the LED to have a uniform illuminance distribution.

7. The runway-embedded flash lighting device according to claim 6, further comprising:
a heat radiating member, wherein
the heat radiating member is placed on the substrate of the LED flash light source on a surface opposite to an LED mounting side.

8. The runway-embedded flash lighting device according to claim 1, wherein
the ceiling member comprises an upper ceiling portion and a lower ceiling portion,
the upper ceiling portion is disposed on a rear side relative to an emission direction of the flash emission window, and
the lower ceiling portion is disposed on an emission direction side of the flash emission window.

9. The runway-embedded flash lighting device according to claim 1, wherein the body is cylindrical in shape.

10. A runway-embedded flash lighting device comprising:
a body;
a ceiling member;
a light guide member;
an LED flash light source; and
a bottom cover member, wherein
the body is configured to be embedded in a runway,
the ceiling member is disposed in an upper opening of the body and configured to be exposed to a runway surface when the body is embedded in the runway,
the ceiling member comprises a flash emission window,
the light guide member is disposed in the flash emission window,
the LED flash light source is disposed inside the body and configured to emit a flash toward the light guide member,
the light guide member is configured to allow the flash emitted from the LED flash light source to be emitted from the flash emission window to outside the runway-embedded flash lighting device,
the bottom cover member is disposed on and covers the lower opening of the body, and
the bottom cover member comprises, on an outer surface thereof on a side opposite to the body, a support portion protruding from the outer surface of the bottom cover member,
wherein
the bottom cover member comprises a cable gland and an external ground terminal,
the cable gland and the external ground terminal protrude from the outer surface of the bottom cover member, and
a height of the support portion protruding from the outer surface of the bottom cover member is equal to or greater than a height of the cable gland and a height of the external ground terminal protruding from the outer surface.

11. The runway-embedded flash lighting device according to claim 10, wherein the support portion comprises:
two or more support portion members, and
the two or more supporting portion members have the same height protruding from the outer surface of the bottom cover member.

12. The runway-embedded flash lighting device according to claim 11, wherein
the two support portion members are disposed on the outer surface of the bottom cover member and face each other.

13. The runway-embedded flash lighting device according to claim 11, wherein
the two or more support portion members are placed on the outer surface of the bottom cover member and align in a circumferential direction.

14. The runway-embedded flash lighting device according to claim 13, wherein
the two or more support portion members are equally spaced in the circumferential direction.

15. The runway-embedded flash lighting device according to claim 10, wherein
the LED flash light source comprises:
a substrate;
an LED; and
a lens member,
the LED is disposed on the substrate,
the lens member is disposed above the LED, and
the lens member is configured to allow an emission surface of a flash emitted from the LED to have a uniform illuminance distribution.

16. The runway-embedded flash lighting device according to claim 15, further comprising:
a heat radiating member, wherein
the heat radiating member is placed on the substrate of the LED flash light source on a surface opposite to an LED mounting side.

17. The runway-embedded flash lighting device according to claim 10, wherein
the ceiling member comprises an upper ceiling portion and a lower ceiling portion,
the upper ceiling portion is disposed on a rear side relative to an emission direction of the flash emission window, and
the lower ceiling portion is disposed on an emission direction side of the flash emission window.

18. The runway-embedded flash lighting device according to claim 10, wherein the body is cylindrical in shape.

* * * * *